May 11, 1943.   G. W. FLINT ET AL   2,318,847
BEARING GREASE
Filed Dec. 31, 1940
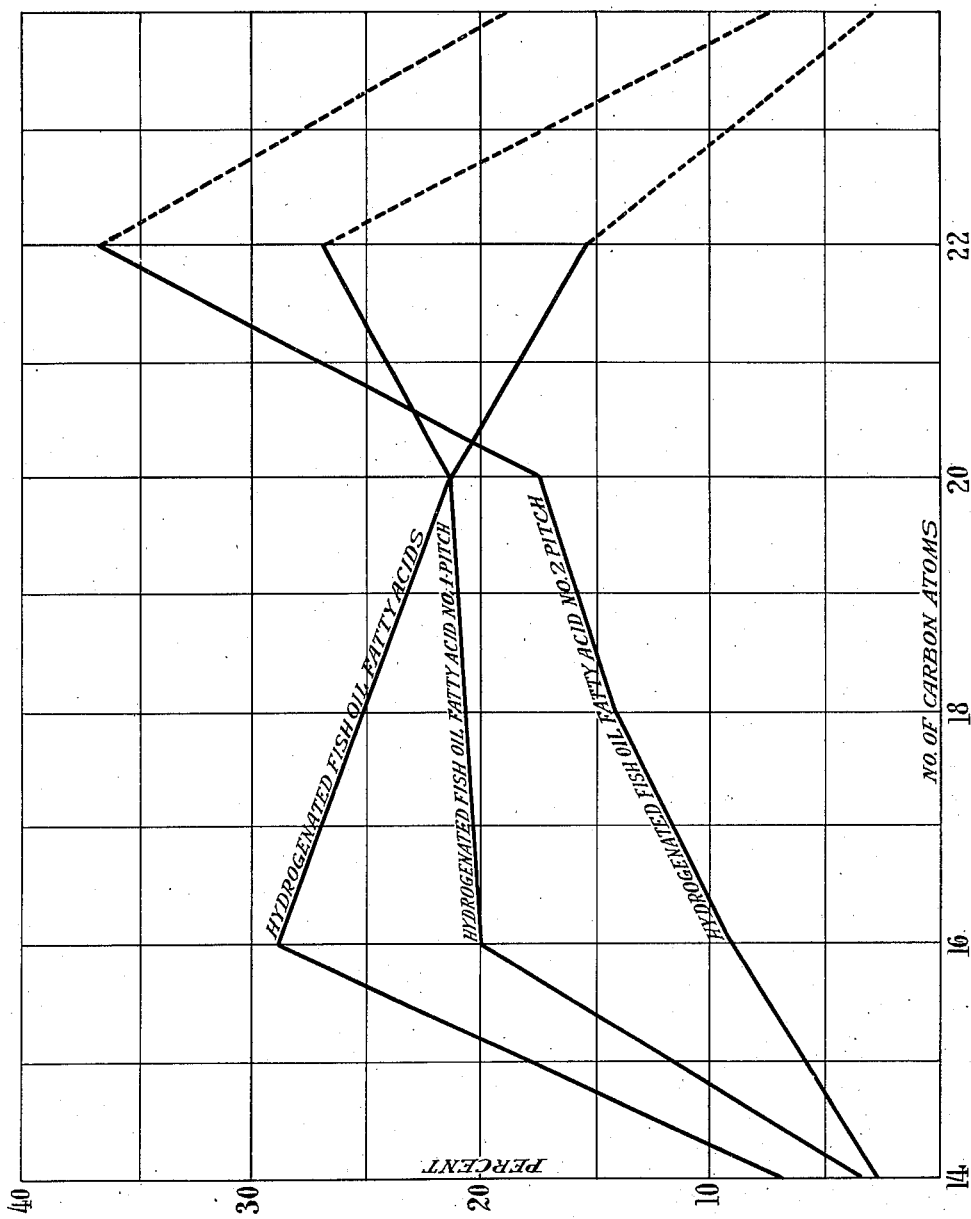

Patented May 11, 1943

2,318,847

UNITED STATES PATENT OFFICE 2,318,847

BEARING GREASE

George W. Flint, Chicago, Ill., and Hubert J. Liehe, Hammond, Ind., assignors to Standard Oil Company, Chicago, Ill., a corporation of Indiana Application December 31, 1940, Serial No. 372,524

16 Claims. (Cl. 252—40)

The present invention relates to improvements in greases and in particular to improvements in "anti-friction" greases such as greases for ball bearings, roller bearings and the like.

Greases for anti-friction bearings of the type of ball or roller bearings must meet certain general requirements. They should be soft and of a butter-like or short fibre structure. Upon being worked the consistency of such greases should not be materially altered. The grease must be usable and not separate oil or "leak" during operation over a wide range of temperature, such as at temperatures from −10° F. to a temperature of about 220° F. or higher.

It is an object of the present invention to provide an improved "anti-friction" bearing grease possessing the foregoing requirements. It is a further object of our invention to provide a more economical anti-friction bearing grease which possesses the necessary properties to provide satisfactory performance equal to or excelling the performance of greases prepared from more expensive constituents usually used in the manufacture of such greases. Other objects and advantages of the present invention will become apparent from the following description thereof and the accompanying drawing which forms a part of this specification, which is a chart showing the fatty acid composition of the essential ingredient of our improved grease.

We have discovered that anti-friction bearing greases for use in ball bearings, roller bearings, wheel bearings, and the like having all the desirable properties required of such greases can be obtained by replacing the greater portion of fatty materials usually employed for forming the soap base of such greases with hydrogenated fish oil fatty acid pitch which is the pitch obtained from the distillation of hydrogenated fish oils.

This material may be obtained in the following manner: The fish oil, for example, sardine oil, herring oil, cod-liver oil, menhaden oil, or the like, is either hydrogenated and split or split and hydrogenated and subsequently distilled to produce an overhead distillate of hydrogenated fish oil fatty acids and a residue referred to herein as No. 1 stearine pitch. The No. 1 stearine pitch, in which are concentrated some fatty materials, may be used as such for our purposes. However, it is preferred to submit the No. 1 stearine pitch to a splitting operation to produce more glycerine and hydrogenated fatty acids. After separation of the glycerine the hydrogenated fatty acids are distilled to produce an overhead product of hydrogenated fish oil fatty acids which may be combined with the distillate from the first distillation. The residue resulting from the second distillation is the material we prefer to use and is referred to herein as No. 2 stearine pitch.

These pitches, commonly referred to as stearine pitches, are not to be confused with the tarry fatty acids pitches obtained by the distillation of normally occurring animal and vegetable fatty materials. The pitch obtained as a residue in the distillation of hydrogenated fish oil is distinguished from the so-called stearine pitches from animal or vegetable fatty materials in that the latter are relatively high in unsaponifiable matter and deficient in fatty acids above $C_{18}$. In contrast, the pitches obtained from the distillation of hydrogenated fish oils are saturated, rich in $C_{20}$, $C_{22}$, $C_{24}$, and high molecular weight fatty acids and are relatively low in unsaponifiable matter. These pitches contain at least 50% of $C_{20}$ to $C_{24}$ and higher molecular weight fatty acids, counting, in addition to the free fatty acids the fatty acids obtainable by hydrolyzing the fats present in the pitches. Stearine pitch as obtained in the distillation of vegetable or animal fats is a dark tarry material, whereas the pitches obtained as residues from the distillation of the hydrogenated fish oil are crystalline in structure and are of a relatively light color.

The inspections on representative samples of No. 1 stearine pitch and No. 2 stearine pitch are given in Table I below.

TABLE I

Typical analyses of hydrogenated fish oil fatty acid pitches

|  | No. 1 pitch | | No. 2 pitch | |
| --- | --- | --- | --- | --- |
|  | Sample No. 1 | Sample No. 2 | Sample No. 1 | Sample No. 2 |
| Saponification No. mg. KOH/gm | | | 151 | 152.6 |
| Free fatty acid (as oleic) per cent | 16.6 | 18.4 | 10.5 | 15.3 |
| Total fatty acid do | 93 | | 86.5 | 86.3 |
| Fat do | 79.7 | 79.7 | 79.3 | 74.2 |
| Neutralization No. (acids) mg. KOH/gm | | | 178 | 177 |
| Moisture-insoluble-unsaponifiable per cent | 4.3 | 3.9 | 10.4 | 11.8 |
| Iodine value (Hanus) | 4.2 | 5.6 | | |
| Melting point ° F | 58.8 | 75.6 | 59.0 | 78.0 |

As indicated in the above table the No. 1 pitch has a very low moisture-insoluble-unsaponifiable content and an extremely low iodine value. This pitch, as indicated by its low iodine value, is as saturated as double pressed stearic acid. The high total fatty acid content of these pitches as compared to the total fatty acid content of not substantially more than about 10% for the so-called stearine pitches from animal and vegetable fats makes the former valuable as a soap stock for grease-making.

The composition of the total fatty acids from No. 1 and No. 2 pitches and the composition of the distilled hydrogenated fish oil fatty acids is given in Table No. II.

TABLE II

*Composition of fatty acids*

|  | No. 1 pitch | No. 2 pitch | Distilled hydrogenated fish oil fatty acids |
|---|---|---|---|
|  | Per cent | Per cent | Per cent |
| $C_{14}$ | 3.5 | 2.5 | 6.7 |
| $C_{16}$ | 20.0 | 9.2 | 28.8 |
| $C_{18}$ | 20.8 | 14.2 | 25.1 |
| $C_{20}$ | 21.1 | 17.6 | 21.1 |
| $C_{22}$ | 27.1 | 37.7 | 15.4 |
| $C_{24}$ and unidentified | 7.5 | 18.8 | 2.9 |

The data of Table II are graphically represented in the accompanying drawing. As noted from the above data, the No. 1 pitch and No. 2 pitch are rich in $C_{20}$ and particularly $C_{22}$ and higher fatty acids.

Our improved grease is preferably prepared by the so-called high-alkali method, employing hydrogenated fish oil fatty acid pitch, a mineral oil of the desired viscosity, caustic and a suitable fatty acid, such as vegetable fatty acids, for example, cottonseed fatty acids, animal fatty acids, mixed animal fatty acids, and the like. In preparing the grease, all of the hydrogenated fish oil fatty acid pitch and a portion of the oil, for example a quantity equal to the hydrogenated fish oil fatty acid pitch are mixed and caustic soda added to the mixture sufficient to leave about 0.5% to about 5%, for instance about 3–4%, of free caustic soda after saponification. Saponification is carried out at an elevated temperature and during the early stages small amounts of water are added to the mixture to aid in saponification and suspension of the excess alkali. After the mixture has been heated several hours the temperature is raised to about 270° F. to about 300° F. and maintained at this temperature for a period sufficient to complete saponification and to remove substantially all of the moisture. Additional mineral oil is then graded in to lower the temperature to about 235° F. to 260° F. and to give a soap content of about 15% to about 25%. The excess alkalinity is then neutralized with the fatty acid material to give a product having approximately 0.1% free alkali. In place of the fatty acid material a fat may be used. The grease, if too hard, is then graded to the desired consistency and discharged from the kettle at a temperature from about 240° F. to 250° F.

Greases of the herein described type contain from about 10% to about 30% or more and usually from about 15% to 20% of soda soap and comprise the following ingredients in approximately the specified proportions by weight:

Hydrogenated fish oil
fatty acid pitch ........... 7.7% to 23.1%, preferably 11.6% to 15.4%
Saponifying agent (dry).. 1.5% to 4.5%, preferably 2.2% to 3.0%
Fatty acid material ....... 2.8% to 8.4%, preferably 4.2% to 5.6%
Mineral oil .................. 88.0% to 64.0%, preferably 82.0% to 76.0%

The mineral oil employed may range in viscosity from about 180 seconds to 1500 seconds Saybolt Universal viscosity at 100° F. and may be a closely cut fraction or a blend of oils to give the viscosity desired.

As an illustration of the present invention, the following example is given. A wheel bearing grease having the following formula, 14.75 pounds (14.5%) of hydrogenated fish oil fatty acid No. 2 pitch
2.88 pounds (2.8%) dry NaOH
5.38 pounds (5.3%) cottonseed fatty acids
77.7 pounds (77.4%) mineral oil (900 sec. Saybolt Universal viscosity at 100° F.)

is prepared by mixing all of the hydrogenated fish oil fatty acid No. 2 pitch with about 14.75 pounds of the mineral oil and adding to the mixture all of the sodium hydroxide, preferably in a 48° Bé. solution. Saponification is carried out at about 240° F. to 260° F. for about five hours. Small amounts of water are added to the mixture during the early stages of saponification. At the end of the five hour period the temperature of the mixture is raised to about 270° F. to 300° F. and maintained at this temperature to complete the saponification and to dry out the soap base. Sufficient additional mineral oil is then added to give a mixture having about 14% to 16% soap, during which addition the temperature of the mixture is permitted to drop to about 240° F. to about 260° F. The addition of all of the caustic as above described results in the mixture having excess alkalinity of from about 3% to 4% in the base, and from about 0.8%–1.5% after the addition of the oil. At this stage the excess caustic is neutralized by adding all of the cottonseed fatty acid, resulting in a product having free alkalinity of approximately 0.1%. The grease is then graded to the desired consistency and discharged from the mixer at a temperature of from 240° F. to 250° F.

The grease prepared in the foregoing manner is unique in that for a fibre grease it has an extremely short fibred structure, is exceptionally dense and shows no leakage from a front wheel bearing assembly when tested at a temperature of about 200° F. for a considerable period of time.

If desired a minor amount of calcium or other soap can be used in combination with the soda soap, preferably made first before any soda soap is formed, or made separately and then added.

Although we have described our invention in connection with certain specific embodiments thereof, it is to be understood that these are by way of example and are not by way of limitation and we do not wish to limit our invention thereby but only as defined by the appended claims.

We claim:

1. A bearing grease comprising a base of a soda soap of hydrogenated fish oil fatty acid pitch and a mineral oil, said soda soap of hydrogenated fish oil fatty acid pitch being prepared by saponifying a hydrogenated fish oil fatty acid pitch with sufficient sodium hydroxide to give about 0.5% to about 5% excess alkalinity after saponification and subsequently substantially neutralizing the free alkalinity with a fatty material.

2. A bearing grease comprising a base of a sodium soap of hydrogenated fish oil fatty acid pitch and a mineral oil, said sodium soap of hydrogenated fish oil fatty acid pitch being prepared by saponifying hydrogenated fish oil fatty acid pitch with sufficient sodium hydroxide to give 3% to about 4% free caustic after saponification and subsequently substantially neutralizing the free caustic by the addition of a high molecular weight soap-forming fatty acid.

3. A bearing grease as described in claim 2 in which the fatty acid is cottonseed fatty acids.

4. A grease prepared from the following ingredients in approximately the specified proportions by weight:

| | Per cent |
|---|---|
| Hydrogenated fish oil fatty acid pitch | 7.7 to 23.1 |
| Caustic soda (dry) | 1.5 to 4.5 |
| High molecular weight soap-forming fatty acid material | 2.8 to 8.4 |
| Mineral oil | 88.0 to 64.0 |

5. A grease prepared from the following ingredients in approximately the specified proportions by weight:

| | Per cent |
|---|---|
| Hydrogenated fish oil fatty acid pitch | 7.7 to 23.1 |
| Dry NaOH | 1.5 to 4.5 |
| Cottonseed fatty acid | 2.8 to 8.4 |
| Mineral oil | 88.0 to 64.0 |

6. A grease made from the following ingredients in approximately the specified proportions by weight:

| | Per cent |
|---|---|
| Hydrogenated fish oil fatty acid pitch | 11.6 to 15.4 |
| Caustic soda (dry) | 2.2 to 3.0 |
| High molecular weight soap-forming fatty acid material | 4.2 to 5.6 |
| Mineral oil | 82.0 to 76.0 |

7. A grease made from the following ingredients in approximately the specified proportions by weight:

| | Per cent |
|---|---|
| Hydrogenated fish oil fatty acid pitch | 11.6 to 15.4 |
| Dry NaOH | 2.2 to 3.0 |
| Cottonseed fatty acid | 4.2 to 5.6 |
| Mineral oil | 82.0 to 76.0 |

8. A grease made from the following ingredients in approximately the specified proportions by weight:

| | Per cent |
|---|---|
| Hydrogenated fish oil fatty acid pitch | 14.5 |
| Dry NaOH | 2.8 |
| Cottonseed fatty acid | 5.3 |
| Mineral oil | 77.4 |

9. A grease comprising the following ingredients in approximately the specified proportions by weight:

| | Per cent |
|---|---|
| Hydrogenated fish oil fatty acid pitch soda soap | 6.9 to 20.8 |
| Animal fatty acid soda soap | 3.1 to 9.2 |
| Mineral oil | 88.0 to 64.0 |
| Unsaponifiable | 2.0 to 6 |

10. A grease comprising the following ingredients in approximately the specified proportions by weight:

| | Per cent |
|---|---|
| Hydrogenated fish oil fatty acid pitch soda soap | 10.4 to 13.9 |
| Animal fatty acid soda soap | 4.6 to 6.1 |
| Mineral oil | 82.0 to 76.0 |
| Unsaponifiable | 3.0 to 4.0 |

11. A grease comprising the following ingredients in approximately the specified proportions by weight:

| | Per cent |
|---|---|
| Hydrogenated fish oil fatty acid pitch soda soap | 13.0 |
| Animal fatty acid soda soap | 5.8 |
| Mineral oil | 77.4 |
| Unsaponifiable | 3.8 |

12. The method of preparing a grease containing a base of a soda soap of hydrogenated fish oil fatty acid pitch and a mineral oil, comprising the steps, mixing a portion of the mineral oil with a hydrogenated fish oil fatty acid pitch, saponifying said hydrogenated fish oil fatty acid pitch, with sufficient soda hydroxide to give a product having from about .5% to about 5% excess alkalinity after saponification, grading in the remaining portion of the mineral oil and subsequently neutralizing the excess alkalinity of said saponified product with a fatty material.

13. The method of preparing a grease containing a base of a metal soap of hydrogenated fish oil fatty acid pitch and mineral oil, comprising the steps, mixing a portion of the mineral oil with hydrogenated fish oil fatty acid pitch, saponifying said hydrogenated fish oil fatty acid pitch with sufficient sodium hydroxide to produce a hydrogenated fish oil fatty acid pitch soap having from about 3% to about 4% free alkalinity after saponification, grading in additional mineral oil, and subsequently adding a sufficient amount of a high molecular weight soap-forming fatty acid to substantially neutralize the free alkalinity of said hydrogenated fish oil fatty acid pitch soap.

14. The method described in claim 13 in which the fatty acid is cottonseed fatty acid.

15. A bearing grease comprising a mineral oil and a soap base comprising a major proportion of a soda soap of a hydrogenated fish oil fatty acid pitch and a minor proportion of a metal soap other than soda soap, said soda soap of hydrogenated fish oil fatty acid pitch being prepared by saponifying a hydrogenated fish oil fatty acid pitch with sufficient sodium hydroxide to give about 0.5% to about 5% excess alkalinity after saponification and subsequently substantially neutralizing the free alkalinity with a fatty material.

16. A grease as described in claim 15 in which the metal soap constituting the minor proportion of the soap base is a calcium soap.

GEORGE W. FLINT.
HUBERT J. LIEHE.

CERTIFICATE OF CORRECTION.

Patent No. 2,318,847. May 11, 1943.

GEORGE W. FLINT, ET AL.

It is hereby certified that error appears in the printed specification of the above numbered patent requiring correction as follows: Page 3, second column, line 25, claim 12, for "soda" read --sodium--; and that the said Letters Patent should be read with this correction therein that the same may conform to the record of the case in the Patent Office.

Signed and sealed this 22nd day of June, A. D. 1943.

(Seal)

Henry Van Arsdale,
Acting Commissioner of Patents.